United States Patent [19]

Yoshinaga et al.

[11] Patent Number: 4,721,367
[45] Date of Patent: Jan. 26, 1988

[54] LIQUID CRYSTAL DEVICE

[75] Inventors: Kazuo Yoshinaga, Machida; Akira Tsuboyama, Tokyo; Kazuharu Katagiri, Tama; Osamu Taniguchi, Kawasaki, all of Japan

[73] Assignee: Canon Kabushiki Kaisha, Tokyo, Japan

[21] Appl. No.: 843,235

[22] Filed: Mar. 24, 1986

[30] Foreign Application Priority Data

Apr. 1, 1985 [JP] Japan .................................. 60-66640
Apr. 23, 1985 [JP] Japan .................................. 60-85399

[51] Int. Cl.$^4$ ................. G02F 1/13; C09K 19/34; C07D 241/02
[52] U.S. Cl. .................. 350/350 S; 252/299.5; 252/299.61; 252/299.64; 252/299.65; 252/299.66; 252/299.67; 252/299.68; 252/299.01; 350/333; 350/336; 350/340; 350/341; 428/1; 544/405; 544/406
[58] Field of Search ................. 350/350 S, 350 R, 333, 350/340, 341, 336; 252/299.5, 299.61, 299.65, 299.64, 299.67, 299.68, 299.66, 299.01; 544/405, 406; 428/1

[56] References Cited

U.S. PATENT DOCUMENTS

| | | | |
|---|---|---|---|
| 4,561,726 | 12/1985 | Goodby et al. | 350/350 S |
| 4,563,059 | 1/1986 | Clark et al. | 350/350 S |
| 4,576,732 | 3/1986 | Isogai et al. | 252/299.65 |
| 4,586,791 | 5/1986 | Isogai et al. | 252/299.01 |
| 4,592,857 | 6/1986 | Sugimori et al. | 252/299.61 |
| 4,613,209 | 9/1986 | Goodby et al. | 252/299.61 |
| 4,615,586 | 10/1986 | Geary et al. | 252/299.01 |
| 4,622,165 | 11/1986 | Kano et al. | 252/299.65 |
| 4,657,695 | 4/1987 | Saito et al. | 252/299.61 |

FOREIGN PATENT DOCUMENTS

| | | | |
|---|---|---|---|
| 136725 | 4/1985 | European Pat. Off. | 252/299.01 |
| 156726 | 10/1985 | European Pat. Off. | 252/299.65 |
| 174541 | 3/1986 | European Pat. Off. | 252/299.61 |
| 178647 | 4/1986 | European Pat. Off. | 252/299.01 |
| 3605147 | 8/1986 | Fed. Rep. of Germany | 252/299.61 |
| 3515374 | 11/1986 | Fed. Rep. of Germany | 252/299.61 |
| 3515373 | 11/1986 | Fed. Rep. of Germany | 252/299.61 |
| 8600067 | 1/1986 | PCT Int'l Appl. | 252/299.61 |
| 8600087 | 1/1986 | PCT Int'l Appl. | 252/299.61 |
| 8606401 | 11/1986 | PCT Int'l Appl. | 252/299.61 |

OTHER PUBLICATIONS

Patel, J. S., et al, Ferroelectrics, vol. 59, pp. 137–144 (1984).
Dewar, M. J. S., et al., Liquid Crystals & Ordered Fluids, vol. 2, Plenum Press, N.Y., pp. 733–741 (1980).
Nash, J. A. et al, Mol. Cryst. Liq. Cryst. vol. 25, pp. 299–321 (1974).

*Primary Examiner*—Teddy S. Gron
*Attorney, Agent, or Firm*—Fitzpatrick, Cella, Harper & Scinto

[57] ABSTRACT

A liquid crystal compound represented by the formula (I) below or a liquid crystal composition containing the compound is interposed between a pair of base plates.

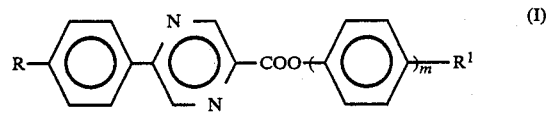

wherein R is an alkyl or alkoxy group having 1–18 carbon atoms; m is 0 or 1; $R^1$ is an alkyl group having 1 to 18 carbon atoms when m is 0 and is an alkyl or alkoxy group having 1–18 carbon atoms when m is 1. The liquid crystal compound or composition is in a chiral smectic phase formed through a phase transition from a higher temperature phase. At least one of the base plates has a face to which an orientation controlling function is imparted for preferentially orienting the liquid crystal molecules in contact with the face in one direction.

28 Claims, 16 Drawing Figures

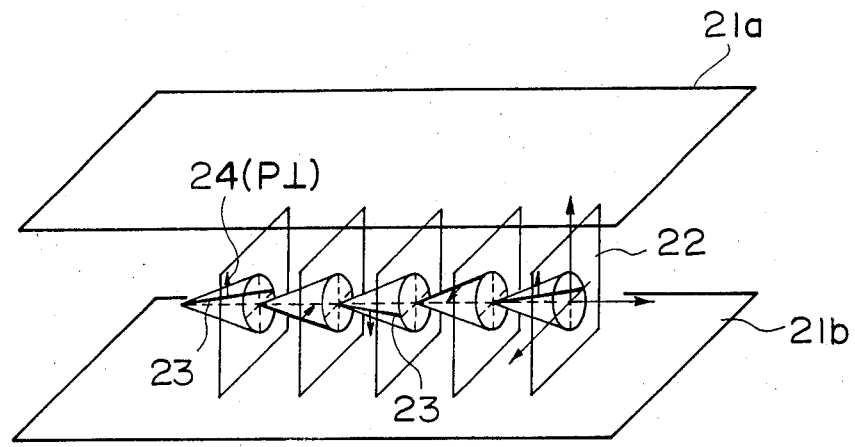
F I G. 1
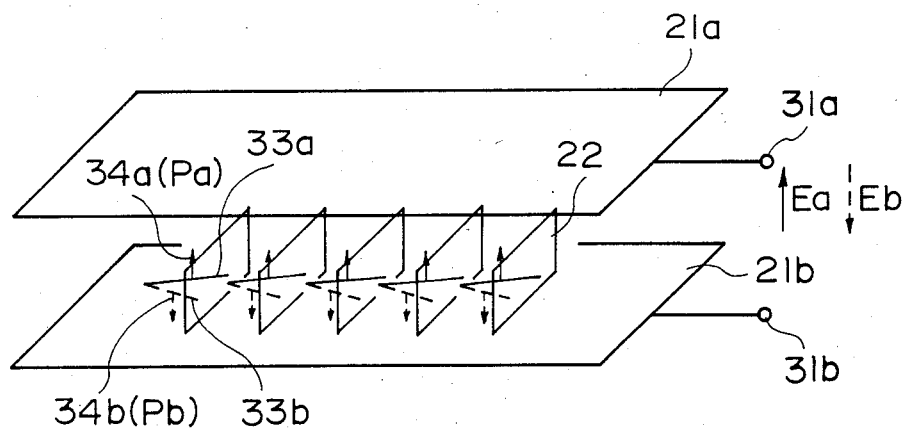
F I G. 2

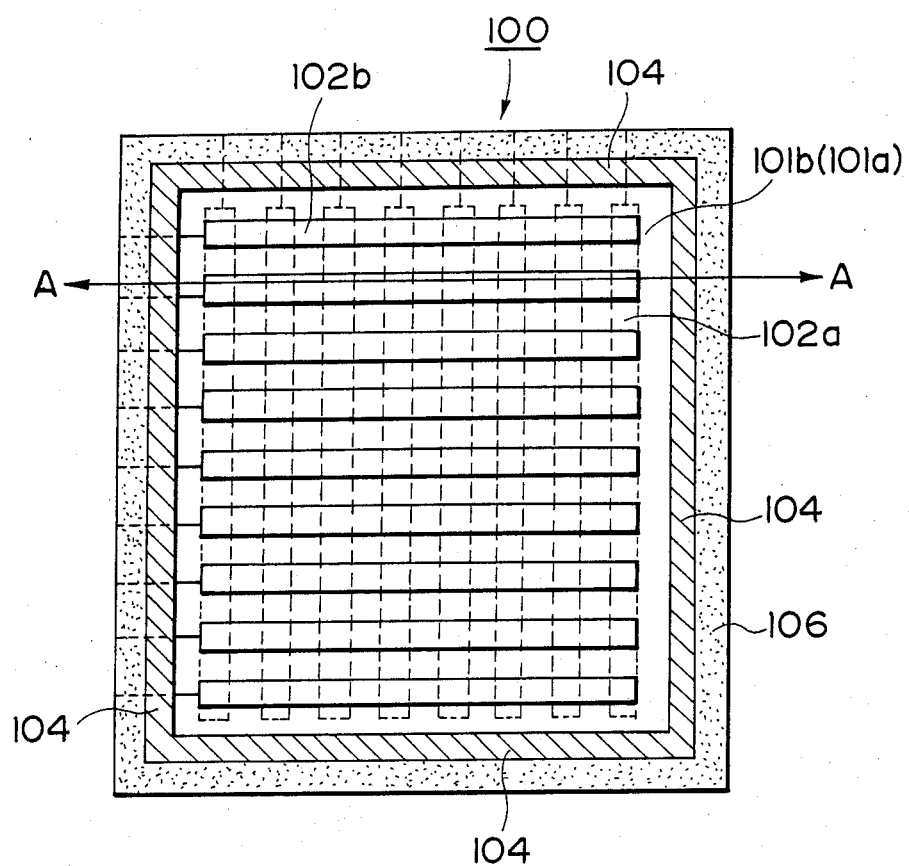
F I G. 3A

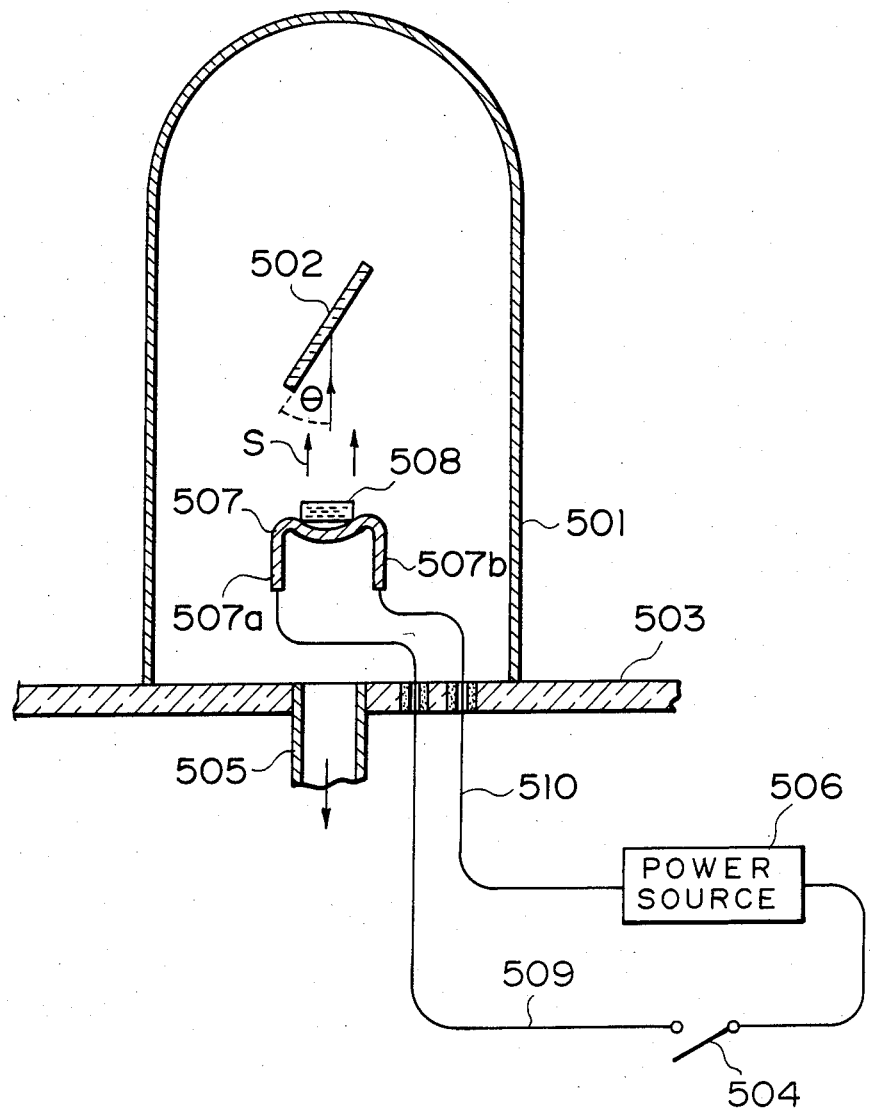
F I G. 5

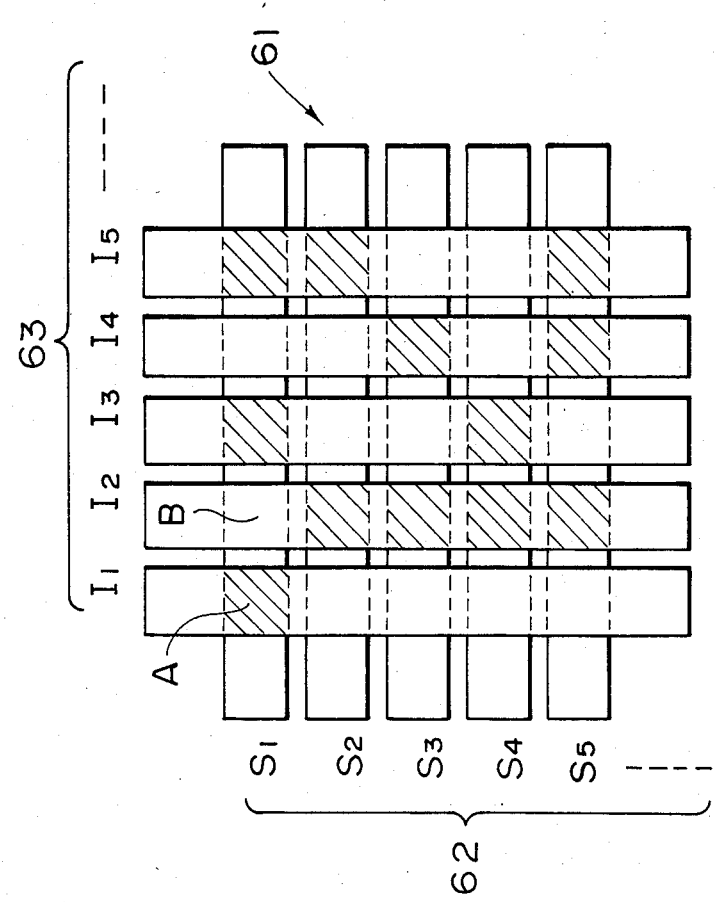
F I G. 6

LIQUID CRYSTAL DEVICE

FIELD OF THE INVENTION AND RELATED ART

The present invention relates to a liquid crystal device, particularly a liquid crystal display device, a liquid crystal-optical shutter array, etc., and more particularly to a liquid crystal device having improved display and driving characteristics through improved initial orientation or alignment of liquid crystal molecules.

In the field of liquid crystal devices, there are a well known type of liquid crystal devices using TN (twisted nematic) type liquid crystals as shown, for example, in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128. In this type of liquid crystal devices, the number of picture elements have been restricted, because there is a problem that a crosstalk phenomenon occurs when a device of a matrix electrode structure with a high density of picture elements is driven according to a time-sharing or time-division driving scheme.

As another type of liquid crystal device, there is known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned drawbacks of the conventional types of liquid crystal devices, Clark and Lagerwall have proposed the use of a liquid crystal device wherein a ferroelectric liquid crystal is disposed in a thin layer having a thickness less than 5 times that of the spiral pitch thereof so that its spiral structure is unwound to develop a bistability (e.g., U.S. Pat. No. 4,367,924). As the bistable liquid crystal, a ferroelectric liquid crystal showing a chiral smectic C phase (SmC*) or H phase (SmH*) is generally used. Such a ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device. This point will be explained in further detail hereinafter in connection with the present invention.

However, in order that a ferroelectric liquid crystal having bistability can realize desired driving characteristics, it is required that the liquid crystal disposed between a pair of parallel base plates has a molecular arrangement such that the molecules can effectively be switched between the two stable states independent of the application of an electric field. For instance, in connection with ferroelectric liquid crystals having SmC*-, SmI*-, SmJ*-, SmK*-, SmG*-, SmF*-, or SmH*-phase, it is required that there is formed a region (monodomain) where liquid crystal layers having SmC*- or SmH* phase are vertical to the surfaces of base plates, i.e., the liquid crystal axis is aligned substantially in parallel with the surfaces. However, with optical modulation devices in which a liquid crystal having bistability is used, the orientation of the liquid crystal having such a monodomain structure has not satisfactorily been formed, thus failing to obtain sufficient display characteristics.

For instance, in order to give such an orientation, Clark et al have proposed a method of applying an electric field, a method of applying shearing stress, and a method of arranging ridges in parallel with each other at a small interval between base plates, etc. However, these methods could not necessarily provide satisfactory results. For instance, the method of applying an electric field has drawbacks that it requires a large scale apparatus and is not compatible with a thin layer cell having excellent operational characteristics. Further, the method of applying a shearing stress has the drawback that it is not compatible with a method of filling a liquid crystal after a cell is prepared. Furthermore, the method of arranging parallel ridges within the cell cannot provide a stable orientation effect by itself.

Further, when the liquid crystal device showing bistability is driven for a line-by-line writing operation, some of the picture elements which have been written corresponding to information signals for the picture can change the stable orientation of the liquid crystal from the orientation state for displaying the written signal to the other orientation state. This is, for example, a phenomenon that picture elements which have been written to display "white" signal are reversed to the state for displaying "black" signal. Such reversal phenomena makes it difficult to use the ferroelectric liquid crystal device as a display device.

SUMMARY OF THE INVENTION

An object of the present invention is, in view of the above-mentioned circumstances, to provide a ferroelectric liquid crystal device which has potential adaptability to a display device having a high response speed characteristic, a high density of picture elements and a large display area, or an optical shutter having a high shutter speed, and to have the ferroelectric liquid crystal device fully exhibit its performances by improving the monodomain formation characteristic or the initial alignment characteristic which has been the principal problem of the device.

Another object of the present invention is to provide a liquid crystal device wherein the above mentioned reversal phenomenon has been prevented and a display state written corresponding to an information signal can be stably retained for a period of one frame or one field.

We have made a further study with the above objects. As a result, we have observed that a monodomain where liquid crystal molecules are aligned in one direction can be formed when a smectic A or chiral smectic phase is formed through phase transition from a higher temperature phase than a smectic phase such as cholesteric phase (chiral nematic phase), nematic phase or isotropic phase by gradual cooling of a liquid crystal showing the phase transition or a composition containing the liquid crystal interposed between a pair of base plates, to at least one of which a uniaxial orientation effect has been imparted. Thus, a liquid crystal device having operation characteristics based on the bistability of the liquid crystal and a monodomain formation characteristic of the liquid crystal layer in combination is provided.

The liquid crystal device according to the present invention is based on the above finding and, more particularly, comprises a liquid crystal device comprising a cell structure including a pair of base plates and a liquid crystal compound represented by the formula (I) shown below or a liquid crystal composition containing the compound and interposed between the pair of base plates; said liquid crystal compound or composition being in a smectic phase formed through a phase transition from a higher temperature phase, a face of at least one of said pair of base plates having been provided with a function of preferentially orienting the axes of the liquid crystal molecules contacting the face in one direction: formula (I):

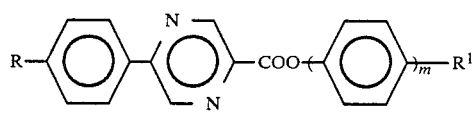

where R is an alkyl or alkoxy group having 1–18 carbon atoms; m is 0 or 1; $R^1$ is an alkyl group having 1 to 18 carbon atoms when m is 0 and is an alkyl or alkoxy group having 1–18 carbon atoms when m is 1.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal device using a chiral smectic liquid crystal;

FIG. 3A is a plan view showing an example of the liquid crystal device according to the present invention.

FIG. 5 is a sectional view schematically showing a tilt of oblique vapor deposition apparatus for use in production of the liquid crystal device according to the present invention;

FIG. 6 is a schematic plan view showing an electrode arrangement of a liquid crystal device according to the present invention;

DETAILED DESCRIPTION OF PREFERRED EMBODIMENTS

Figure 3B:
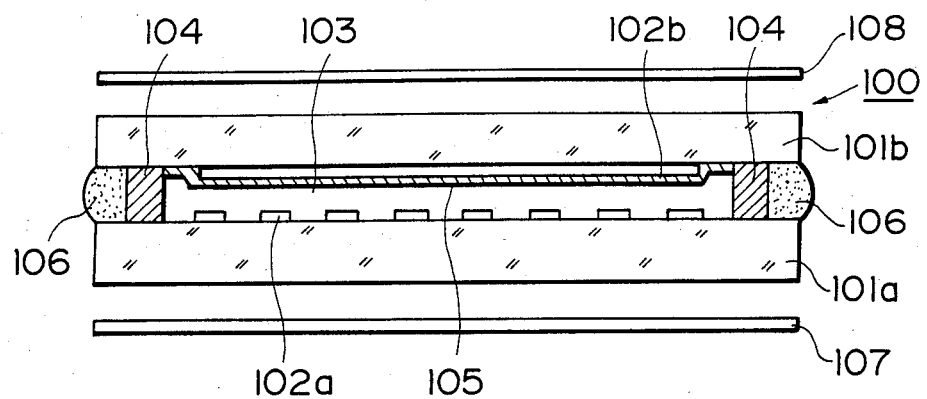
FIG. 3B is a sectional view taken along the line A—A in FIG. 3A.

The liquid crystal to be used in the present invention has ferroelectricity and more specifically shows chiral smectic C phase (SmC*), H phase (SmH*), I phase (SmI*), J phase (SmJ*), K phase (SmK*), G phase (SmG*), or F phase (SmF*).

Specific examples of the compound represented by the formula (I) and process for production thereof will be set forth hereinbelow.

The compound shown by the formula (I) may for example be produced by first hydrolyzing a 2,3-dicyanopyrazine represented by the formula (II):

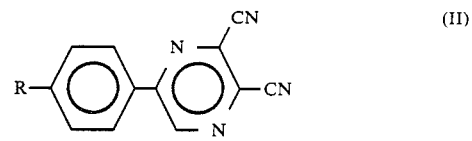

wherein R represents an alkyl or alkoxy group having 1–18 carbon atoms, and decarboxylating the hydrolyzed product to obtain a 2-carboxyprazine derivative shown by the formula (III):

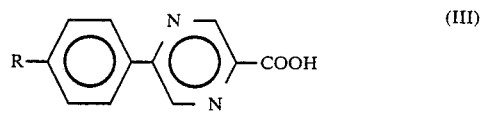

The 2-carboxypyrazine derivative is then halogenated to obtain an acid halide, which is then reacted with a compound shown by the formula (IV) for esterification:

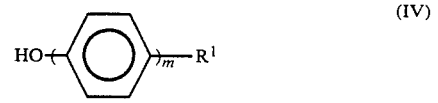

wherein m and $R^1$ are the same as those for the formula (I). Thus, the compound represented by the formula (I) is produced.

Incidentally, the 2,3-dicyanopyrazine derivative shown by the formula (II) is produced by a known process (e.g., Tadataka Tsuda, Nihon Nougei-Kagaku-Kaishi (Journal of Japan Agricultural Chemistry Society) Vol. 52, p. 213 (1978)).

A ferroelectric chiral smectic liquid crystal may easily be obtained by introducing an optically active group into the structure shown by the formula (I). The ferroelectric chiral smectic liquid crystal shown by the formula (I) shown an excellent threshold characteristic when used in a display device as disclosed by N. A. Clark, so that crosstalk can be prevented to provide a good contrast when the ferroelectric chiral smectic liquid crystal is driven by a simple matrix electrode arrangement. Such a characteristic is similarly attained by a liquid crystal composition containing the liquid crystal or mesomorphic compound shown by the formula (I). Thus, the liquid crystal compound represented by the formula (I) shows an especially excellent performance to provide the ferroelectric chiral smectic liquid crystal or liquid crystal composition for use in a highly fine, large picture display device.

On the other hand, a liquid crystal composition obtained by mixing a compound showing an SmC phase among those having a structure shown by the formula (I) but having no optically active group, e.g., p-octyloxyphenyl 5-(p-octyloxyphenyl)pyrazine-2-carboxylate, with a liquid crystal compound having a chiral smectic phase as shown in Table 3 appearing hereinafter, can be used as a ferroelectric chiral smectic liquid crystal. A liquid crystal composition obtained by mixing a liquid crystal compound having an optically active group but showing no chiral smectic phase or a liquid crystal compound having only an optically active group as shown in Table 4 appearing hereinafter, can also be used as a ferroelectric chiral smectic liquid crystal. The thus obtained ferroelectric chiral smectic liquid crystal has been found to show an excellent threshold characteristic given by the basic structure shown by the formula (I).

In the liquid crystal composition to be used in the present invention, the compound shown by the formula (I) should preferably be contained in an amount of 1–99 wt.%, particularly 5–95 wt. %.

Then, specific examples of synthesis of some compounds represented by the formula (I) are set forth below.

Synthesis Example 1

5-(P-octyloxyphenyl)pyrazine-2-carboxylic acid p-octyloxyphenyl ester was produced through the following steps (I)–(IV).

(1) Synthesis of 5-(p-octyloxyphenyl)pyrazine-2,3-dicarbonitrile:

Selenium dioxide in an amount of 11.4 g (0.1 mol) was mixed with 100 ml of dioxide and 2 ml of water. The mixture was stirred for 2 hours at 70°–75° C., and a solution of 24.8 g (0.1 mol) of p-octyloxyacetophenone in 60 ml of dioxane was added thereto. After 2 hours of refluxing, the mixture was cooled to precipitate metal selenium, which was then removed by filtration. Into the filtrate were added 10.8 g (0.1 mol) of diaminomaleonitrile and 3.0 ml of acetic acid, and the mixture was refluxed for 2 hours at 90°–93° C. After the reaction, the mixture was subjected to cooling and filtration, and the filtrate was condensed to obtain a crude product. The crude product was subjected to recrystallization from hexane to obtain 27.2 g (82% yield) of the product. The meling point: 79° C., IR ($\nu$cm$^{-1}$): 2245 (C≡N).

Elementary analysis (%) as $C_{20}H_{22}N_4O$: Calculated value: C 71.83, H 6.63, N 16.75, Measured value: C 72.02, H 6.75, N 16.55.

(II) Synthesis of 5-(p-octyloxyphenyl)pyrazine-2,3-dicarboxylic acid 8.7 G (0.026 mol) of 5-(P-octyloxyphenyl)pyrazine-2,3-dicarbonitrile was added into a solution of 15 g (0.375 mol) of sodium hydroxide and 600 ml of water, and the mixture was stirred for 3 hours at 95° C. After the reaction, conc. hydrochloric acid was added to acidify the reaction liquid to form a precipitate, which was then separated by filtration. The precipitate was washed with 60 ml of water 5 times and dried under vacuum to obtain a product in an amount of 8.1 g (Yield: 84%). The product was recrystallized from ethanol-water. Melting point: 163° C., IR ($\nu$cm$^{-1}$): 3440–2550 (OH), 1730, 1695 (c=0).

Elementary analysis as $C_{20}H_{24}N_2O_5$: Calculated: C 64.50, H 6.50, N 7.52; Measured: C 64.52, H 6.70, N 7.36.

(III) Synthesis of 5-(p-octyloxyphenyl)pyrazine-2-carboxylic acid 8.1 G (0.0218 mol) of 5-(p-octyloxyphenyl)pyrazine-2,3-dicarboxylic acid was added to 100 ml of dichlorobenzene, and the mixture was stirred for 3.5 hours on an oil bath set to 160° C. After standing overnight, the resultant precipitate was filtered out and washed with 60 ml of hexane two times to obtain 4.1 g of the product, which was then recrystallized from ethanol-water. M.P.: 165° C., Decomposition point: 190° C., IR ($\nu$cm$^{-1}$): 3400–2500 (OH), 1680 (c=0).

Elementary analysis as $C_{19}H_{24}N_2O_3$: Calculated: C 69.49, H 7.37, N 8.53; Measured: c 69.65, H 7.35, N 8.38.

(IV) Esterification 4.10 G (0.0125 mol) of 5-(p-octyloxyphenyl)pyrazine-2-carboxylic acid was added to 80 ml of thionyl chloride, and the mixture was refluxed for 2 hours. After the reaction, an excess of thionyl chloride was distilled off under a reduced pressure, and the residue was dissolved in 250 ml of toluene. The toluene solution was washed with 70 ml of water 4 times and dried with magnesium sulfate. After distilling off the solvent, the residue was washed with hexane and added to 100 ml of acetone. Into the mixture under stirring while being cooled at 5° C., a mixture of 1.77 g (7.96 mmol) of p-octyloxyphenol, 0.36 g (9 mmol) of sodium hydroxide, 10 ml of water and 20 ml of acetone was added dropwise in 25 minutes. Then, after stirring for 2 hours at 5° C., the reaction liquid was filtered. The precipitate was dissolved in 400 ml of toluene, washed with 150 ml of 0.5-normal sodium oxide aqueous solution, and then washed with 200 ml of water 3 times. Then, the toluene solution was dried with magnesium sulfate, and the solvent was distilled off. The residue was washed with hexane and recrystallized from toluene-hexane to obtain a product in an amount of 1.96 g (29% yield), IR ($\nu$cm$^{-1}$): 1730 (c=0).

Elementary analysis as $C_{33}H_{44}N_2O_4$: Calculated: C 74.40, H 8.33, N 5.26; Measured: C 74.55, H 8.51, N 5.09

NMR $\delta$ppm (CDCl$_3$): 9.40 (d, 1H, J=1.5 Hz), 9.15 (d, 1H, J=1.5 Hz), 8.11 (d, 2H), 7.06 (d, 2H), 7.18 (d, 2H), 6.90 (d, 2H), 4.04 (t, 2H), 3.96 (t, 2H), 1.90–0.70 (m, 30H).

Synthesis Examples 2–19

In a similar manner as in Example 1, compounds shown in Table 1 hereinbelow were obtained.

The results of the elementary analysis of the compounds obtained in the Synthesis Examples 1–19 are shown in Table 2 and the phase transition temperatures of the compounds are shown in Table 3.

TABLE 1

Compounds shown by the formula:

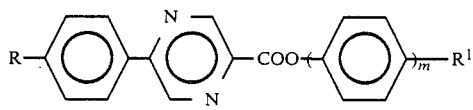

| Example | m | R | R¹ | Molecular formula | Calculated C | Calculated H | Calculated N | Measured C | Measured H | Measured N |
|---|---|---|---|---|---|---|---|---|---|---|
| 2 | 1 | OCH₃ | CH₃ | C₁₉H₁₆N₂O₃ | 71.24 | 5.03 | 8.75 | 71.44 | 5.00 | 8.57 |
| 3 | 1 | OCH₃ | OCH₃ | C₁₉H₁₆N₂O₄ | 67.85 | 4.80 | 8.33 | 67.95 | 4.61 | 8.30 |
| 4 | 1 | OCH₃ | OC₂H₅ | C₂₀H₁₈N₂O₄ | 68.56 | 5.18 | 8.00 | 68.74 | 5.20 | 8.00 |
| 5 | 1 | OCH₃ | O—n-C₈H₁₇ | C₂₆H₃₀N₂O₄ | 71.86 | 6.96 | 6.45 | 72.03 | 7.15 | 6.27 |
| 6 | 1 | OCH₃ | O—n-C₁₂H₂₅ | C₃₀H₃₈N₂O₄ | 73.44 | 7.81 | 5.71 | 73.44 | 7.90 | 5.66 |
| 7 | 1 | O—n-C₄H₉ | O—n-C₄H₉ | C₂₅H₂₈N₂O₄ | 71.41 | 6.71 | 6.66 | 71.38 | 6.70 | 6.52 |
| 8 | 1 | O—n-C₄H₉ | n-C₆H₁₃ | C₂₇H₃₂N₂O₃ | 74.97 | 7.46 | 6.48 | 75.11 | 7.40 | 6.38 |
| 9 | 1 | O—n-C₅H₁₁ | O—n-C₆H₁₃ | C₂₈H₃₄N₂O₄ | 72.70 | 7.41 | 6.06 | 72.90 | 7.66 | 6.00 |
| 10 | 1 | O—n-C₅H₁₁ | n-C₄H₉ | C₂₆H₃₀N₂O₃ | 74.61 | 7.23 | 6.69 | 74.57 | 7.40 | 6.52 |
| 11 | 1 | O—n-C₈H₁₇ | O—n-C₇H₁₅ | C₃₂H₄₂N₂O₄ | 74.10 | 8.16 | 5.40 | 74.01 | 8.23 | 5.24 |
| 12 | 1 | O—n-C₉H₁₉ | n-C₆H₁₃ | C₃₂H₄₂N₂O₃ | 76.46 | 8.42 | 5.57 | 76.42 | 8.61 | 5.38 |
| 13 | 1 | O—n-C₁₂H₂₅ | O—n-C₈H₁₇ | C₃₇H₅₂N₂O₄ | 75.47 | 8.90 | 4.76 | 75.29 | 8.72 | 4.59 |
| 14 | 1 | O—n-C₁₂H₂₅ | O—n-C₁₂H₂₅ | C₄₁H₆₀N₂O₄ | 76.35 | 9.38 | 4.34 | 76.52 | 9.19 | 4.16 |
| 15 | 0 | O—n-C₈H₁₇ | —CH₂C*HCH₂CH₃ (CH₃) | C₂₄H₃₄N₂O₃ | 72.33 | 8.60 | 7.03 | 72.14 | 8.60 | 7.20 |
| 16 | 1 | O—n-C₈H₁₇ | —O—CH₂C*HCH₂CH₃ (CH₃) | C₃₀H₃₈N₂O₄ | 73.44 | 7.81 | 5.71 | 73.25 | 7.70 | 5.51 |
| 17 | 1 | O—n-C₈H₁₇ | —CH₂C*HCH₂CH₃ (CH₃) | C₃₀H₃₈N₂O₃ | 75.91 | 8.07 | 5.90 | 75.66 | 7.94 | 5.75 |
| 18 | 1 | O—n-C₉H₁₉ | —O—CH₂C*HCH₂CH₃ (CH₃) | C₃₁H₄₀N₂O₄ | 74.07 | 7.62 | 5.57 | 73.90 | 7.75 | 5.36 |
| 19 | 1 | C₄H₉ | —CH₂—C*HCH₂CH₃ (CH₃) | C₂₆H₃₀N₂O₂ | 77.58 | 7.51 | 6.96 | 77.45 | 7.42 | 7.14 |

TABLE 2

| Example | m | R | R¹ | Phase transition temperature |
|---|---|---|---|---|
| 15 | 0 | O—n-C₈H₁₇ | —CH₂C*HCH₂CH₃ (CH₃) | C $\xrightarrow{80}$ Sm1 $\xrightarrow{84}$ I |
| 3 | 1 | OCH₃ | OCH₃ | C $\xrightarrow{169}$ N $\xrightarrow{257}$ I |
| 4 | 1 | OCH₃ | OC₂H₅ | C $\xrightarrow{148}$ N $\xrightarrow{256}$ I |
| 5 | 1 | OCH₃ | O—n-C₈H₁₇ | C $\xrightarrow{125}$ N $\xrightarrow{206}$ I |
| 6 | 1 | OCH₃ | O—n-C₁₂H₂₅ | C $\xrightarrow{111}$ SmA $\xrightarrow{185}$ N $\xrightarrow{189}$ I |
| 7 | 1 | O—n-C₄H₉ | O—n-C₄H₉ | C $\xrightarrow{145}$ N $\xrightarrow{223}$ I |
| 9 | 1 | O—n-C₅H₁₁ | O—n-C₆H₁₃ | C $\xrightarrow{127}$ N $\xrightarrow{204}$ I |
| 11 | 1 | O—n-C₈H₁₇ | O—n-C₇H₁₅ | C $\xrightarrow{98}$ Sm3 $\xrightarrow{114}$ SmC $\xrightarrow{184}$ SmA $\xrightarrow{190}$ N $\xrightarrow{194}$ I |
| 1 | 1 | O—n-C₈H₁₇ | O—n-C₈H₁₇ | C $\xrightarrow{115}$ SmC $\xrightarrow{179}$ SmA $\xrightarrow{187}$ N $\xrightarrow{191}$ I |

TABLE 2-continued

| Example | m | R | R¹ | Phase transition temperature |
|---|---|---|---|---|
| 13 | 1 | O—n-$C_{12}H_{25}$ | O—n-$C_8H_{17}$ | C $\xrightarrow{108}$ Sm2 $\xrightarrow{112}$ SmC $\xrightarrow{185}$ I |
| 14 | 1 | O—n-$C_{12}H_{25}$ | O—n-$C_{12}H_{25}$ | C $\xrightarrow{116}$ SmC $\xrightarrow{178}$ I |
| 16 | 1 | O—n-$C_8H_{17}$ | —O—$CH_2\overset{*}{C}HCH_2CH_3$ with $CH_3$ branch | C $\xrightarrow{126}$ SmC* $\xrightarrow{163}$ SmA $\xrightarrow{177}$ I |
| 17 | 1 | O—n-$C_8H_{17}$ | —$CH_2\overset{*}{C}HCH_2CH_3$ with $CH_3$ branch | C $\xrightarrow{124}$ SmC* $\xrightarrow{147}$ SmA $\xrightarrow{161}$ Ch $\xrightarrow{167}$ I |
| 2 | 1 | $OCH_3$ | $CH_3$ | C $\xrightarrow{98}$ N $\xrightarrow{140}$ I |
| 8 | 1 | O—n-$C_4H_9$ | n-$C_6H_{13}$ | C $\xrightarrow{115}$ SmA $\xrightarrow{180}$ N $\xrightarrow{194}$ I |
| 10 | 1 | O—n-$C_5H_{11}$ | n-$C_4H_9$ | C $\xrightarrow{101}$ Sm2 $\xrightarrow{119}$ SmA $\xrightarrow{170}$ N $\xrightarrow{190}$ I |
| 12 | 1 | O—n-$C_9H_{19}$ | n-$C_6H_{13}$ | C $\xrightarrow{103}$ Sm2 $\xrightarrow{110}$ SmA $\xrightarrow{170}$ N $\xrightarrow{172}$ I |
| 18 | 1 | O—n-$C_9H_{19}$ | —O—$CH_2\overset{*}{C}HCH_2CH_3$ with $CH_3$ branch | C $\xrightarrow{122}$ SmC* $\xrightarrow{158}$ SmA $\xrightarrow{172}$ I |
| 19 | 1 | $C_4H_9$ | —$CH_2$—$\overset{*}{C}HCH_2CH_3$ with $CH_3$ branch | C $\xrightarrow{109}$ Sm1 $\xrightarrow{122}$ Ch $\xrightarrow{139}$ I |

TABLE 3

(1)

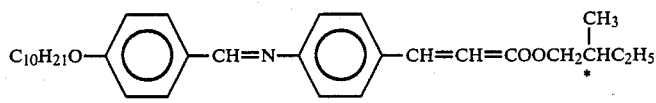

p-(decyloxybenzylidene-p'-amino-2-methylbutylcinnamate (DOBAMBC)

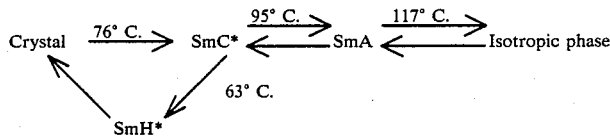

(2)

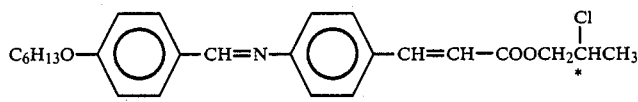

p-hexyloxybenzylidene-p'-amino-2-chloropropylcinnamate (HOBACPC)

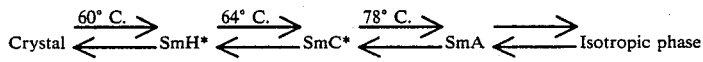

(3)

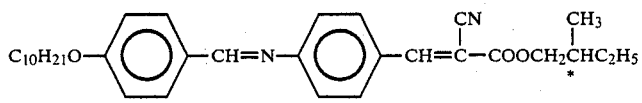

p-decyloxybenzylidene-p'-amino-2-methylbutyl-α-cyanocinnamate (DOBAMBCC)

TABLE 3-continued
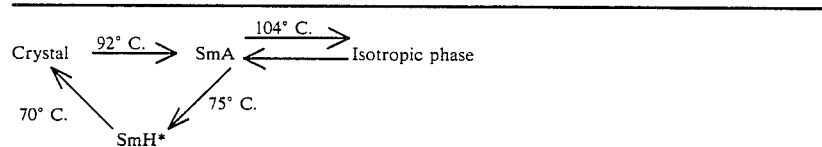
(4)
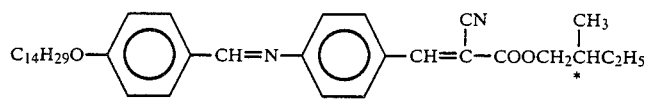
p-tetradecyloxybenzylidene-p'-amino-2-methylbutyl-α-cyanocinnamate (TDOBAMBCC)
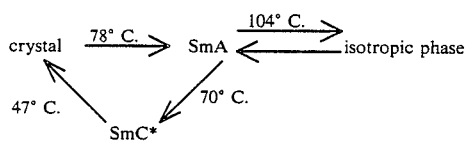
(5)
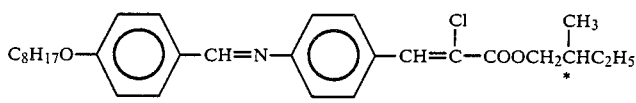
p-octyloxybenzylidene-p'-amino-2-methylbutyl-α-chlorocinnamate (OOBAMBCC)
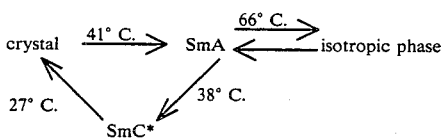
(6)
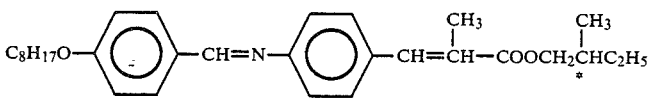
p-octyloxybenzylidene-p'-amino-2-methylbutyl-α-methylcinnamate
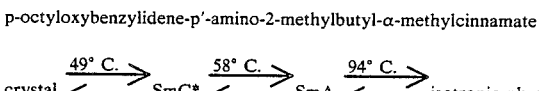
(7)
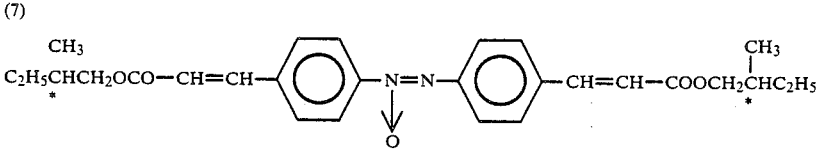
4,4'-azoxycinnamic acid bis(2-methylbutyl)ester
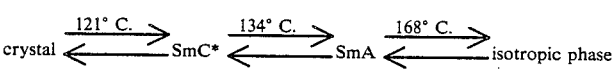
(8)
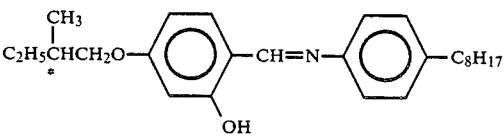
4-o-(2-methyl)-butylresorcylidene-4'-octylaniline (MBRA 8)
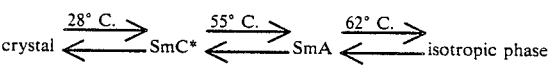

TABLE 3-continued (9)
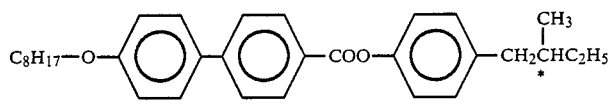

4-(2'-methylbutyl)phenyl-4'-octyloxybiphenyl-4-carboxylate

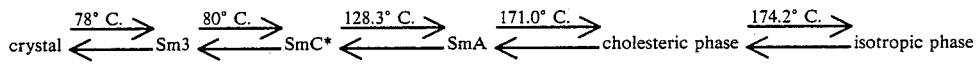

(10)
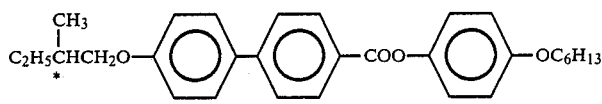

4-hexyloxyphenyl-4-(2''-methylbutyl)biphenyl-4'-carboxylate

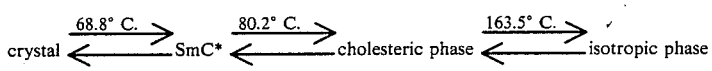

(11)
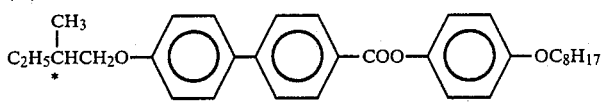

4-octyloxyphenyl-4-(2''-methylbutyl)biphenyl-4'-carboxylate

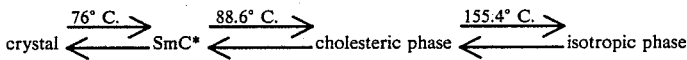

(12)
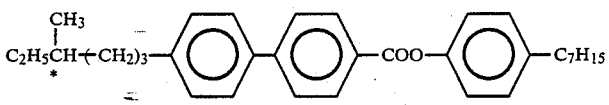

4-heptylphenyl-4-(4''-methylhexyl)biphenyl-4'-carboxylate

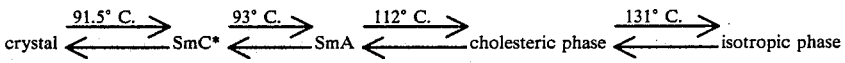

(13)
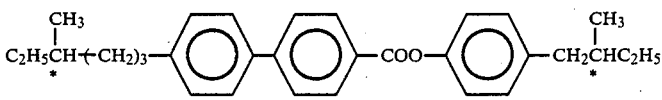

4-(2''-methylbutyl)phenyl-4-(4''-methylhexyl)biphenyl-4'-carboxylate

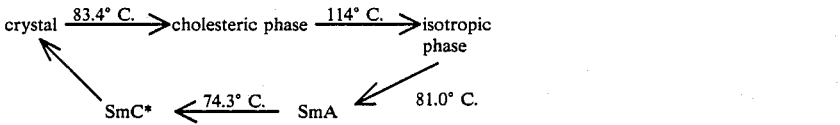

TABLE 4

(A) Cholesteryl propionate

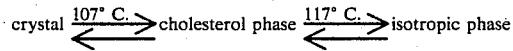

(B) Cholesterylnonanate

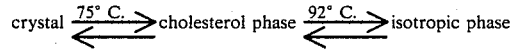

(C) Cholesteryl palmitate

TABLE 4-continued crystal ⇌ 77° C. ⇌ cholesteric phase ⇌ 83° C. ⇌ isotropic phase (D) Cholesteryl benzoate crystal ⇌ 148° C. ⇌ cholesteric phase ⇌ 176° C. ⇌ isotropic phase

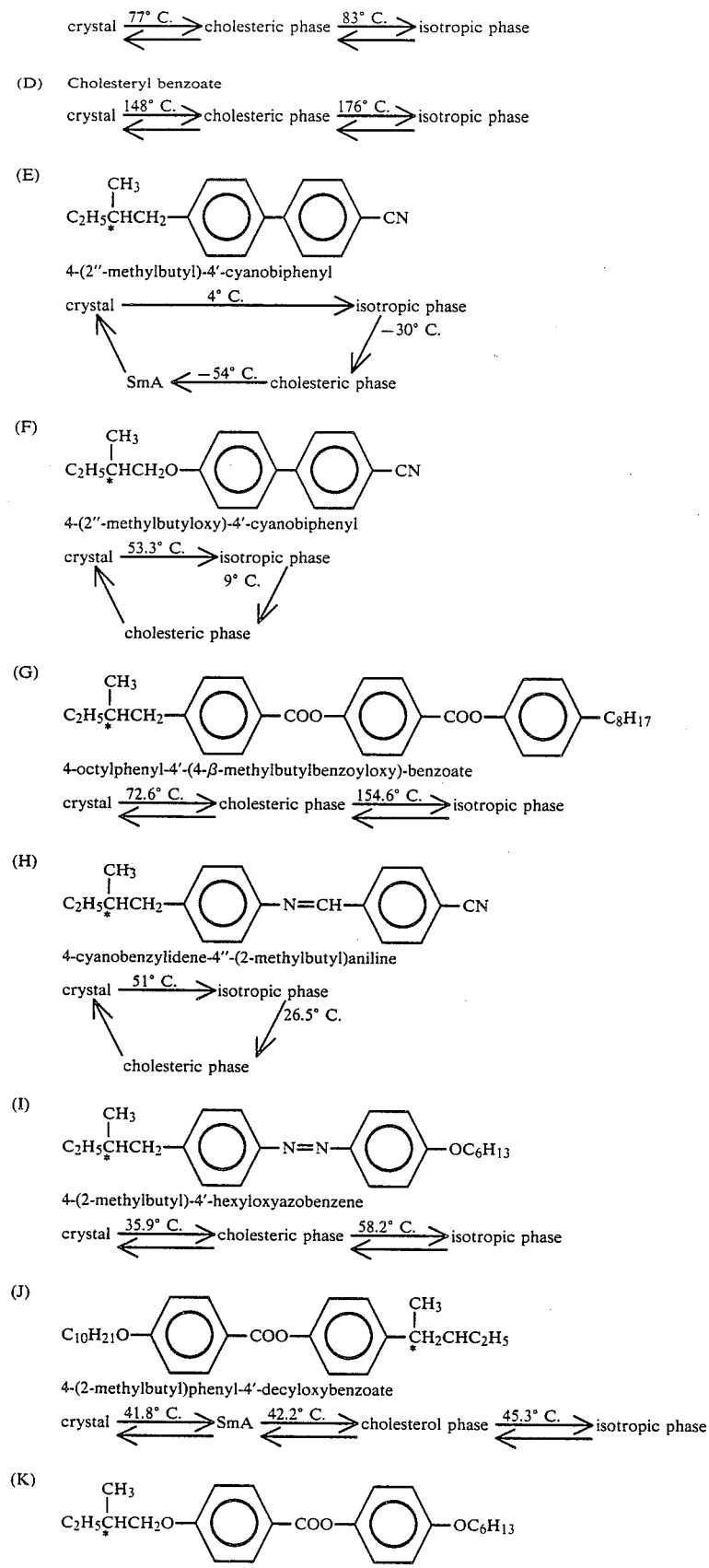

(E) 4-(2″-methylbutyl)-4′-cyanobiphenyl crystal — 4° C. → isotropic phase
↑ ↓ −30° C.
SmA ← −54° C. — cholesteric phase (F) 4-(2″-methylbutyloxy)-4′-cyanobiphenyl crystal — 53.3° C. → isotropic phase
↑ 9° C. ↓
cholesteric phase (G) 4-octylphenyl-4′-(4-β-methylbutylbenzoyloxy)-benzoate crystal ⇌ 72.6° C. ⇌ cholesteric phase ⇌ 154.6° C. ⇌ isotropic phase (H) 4-cyanobenzylidene-4″-(2-methylbutyl)aniline crystal — 51° C. → isotropic phase
↑ ↓ 26.5° C.
cholesteric phase (I) 4-(2-methylbutyl)-4′-hexyloxyazobenzene crystal ⇌ 35.9° C. ⇌ cholesteric phase ⇌ 58.2° C. ⇌ isotropic phase (J) 4-(2-methylbutyl)phenyl-4′-decyloxybenzoate crystal ⇌ 41.8° C. ⇌ SmA ⇌ 42.2° C. ⇌ cholesterol phase ⇌ 45.3° C. ⇌ isotropic phase (K)

TABLE 4-continued

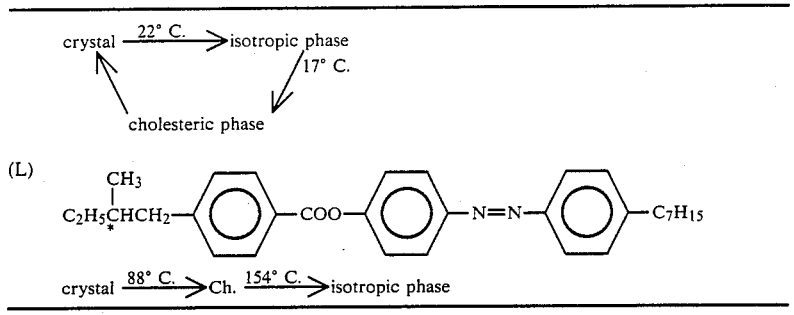

(L)

crystal $\xrightarrow{88° C.}$ Ch. $\xrightarrow{154° C.}$ isotropic phase

When a device is constituted by using these materials, the device may be supported as desired with a block of copper, etc., in which a heater is embedded in order to realize a temperature condition where the liquid crystal composition assumes a desired chiral smectic phase such as SmC*, SmI*, SmJ*, SmK*, SmG*, SmF* or SmH*.

Referring to FIG. 1, there is schematically shown an example of a ferroelectric liquid crystal cell for explanation of the operation thereof. Reference numerals 21a and 21b denote base plates (glass plates) on which a transparent electrode of, e.g., In$_2$O$_3$, SnO$_2$, ITO (Indium-Tin Oxide), etc., is disposed respectively. A liquid crystal of a chiral smectic phase such as SmC* or SmH* in which liquid crystal molecular layers 22 are oriented perpendicular to surfaces of the glass plates is hermetically disposed therebetween. A full line 23 shows liquid crystal molecules. Each liquid crystal molecule 23 has a dipole moment (P$_\perp$) 24 in a direction perpendicular to the axis thereof. When a voltage higher than a certain threshold level is applied between electrodes formed on the base plates 21a and 21b, a helical structure of the liquid crystal molecule 23 is loosened or unwound to change the alignment direction of respective liquid crystal molecules 23 so that the dipole moments (P$_\perp$) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than 10μ). As the thickness of the liquid crystal layer is decreased, the helical structure of the liquid crystal molecules is loosened even in the absence of an electric field whereby the dipole moment assumes either of the two states, i.e., Pa in an upper direction 34a or Pb in a lower direction 34b as shown in FIG. 2. When electric field Ea or Eb higher than a certain threshold level and different from each other in polarity as shown in FIG. 2 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented to either a first stable state 33a or a second stable state 33b.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented to the first stable state 33a. This state is kept stable even if the electric field is removed. On the other hand, when the electric field Ea of which direction is opposite to that of the electric field Ea is applied thereto, the liquid crystal molecules are oriented to the second stable state 33b, whereby the directions of molecules are changed. This state is similarly kept stable even if the electric field is removed. Further, as long as the magnitude of the electric field Ea or Eb being applied is not above a certain threshold value, the liquid crystal molecules are placed in the respective orientation states. In order to effectively realize the high response speed and bistability, it is preferable that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal molecular layers having a chiral smectic phase such as SmC* or SmH* are aligned perpendicular to the base plate faces and the liquid crystal molecules are aligned almost in parallel with the base plate faces. A principal object of the invention is to provide a solution to this problem.

FIGS. 3A and 3B illustrate an example of the liquid crystal device according to the present invention. FIG. 3A is a plan view of the example and FIG. 3B is a sectional view taken along the line A—A in FIG. 3A.

A cell structure 100 shown in FIG. 3 comprises a pair of base plates 101a and 101b made of glass plates or plastic plates which are held with a predetermined gap with spacers 104 and sealed with an adhesive 106 to form a cell structure. On the base plate 101a is further formed an electrode group (e.g., an electrode group for applying scanning voltages of a matrix electrode structure) comprising a plurality of transparent electrodes 102a in a predetermined pattern, e.g., of a stripe pattern. On the base plate 101b is formed another electrode group (e.g., an electrode group for applying signal voltages of the matrix electrode structure) comprising a plurality of transparent electrodes 102b crossing the transparent electrodes 102a.

On the base plate 101b provided with such transparent electrodes 102b may be further formed an orientation controlling film 105 composed of an inorganic insulating material such as silicon monoxide, silicon dioxide, aluminum oxide, titanium oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin and a photoresist resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or $SiO_2$ on the base plate 101a by the oblique or tilt vapor deposition.

In an apparatus shown in FIG. 5, a bell jar 501 is placed on an insulating base plate 503 provided with a suction hole 505 and the bell jar 501 is made vacuum by operating a vacuum pump (not shown) connected the suction hole 505. A crucible 507 made of tungsten or molybdenum is placed inside and at the bottom of the bell jar 501. In the crucible 507 is placed several grams of a crystal 508 such as SiO, $SiO_2$ or $MgF_2$. The crucible 507 has two downwardly extending arms 507a and 507b, which are respectively connected to lead wires 509 and 510. A power source 506 and a switch 504 are connected in series to the lead wires 509 and 510 outside the bell jar 501. A base plate 502 is disposed inside the bell jar 501 and right above the crucible 507 so that it forms an angle of $\theta$ with respect to the vertical axis of the bell jar 501.

First, the bell jar 501 is evacuated to a vacuum of about $10^{-5}$ mmHg while the switch 504 is open. Then the switch 504 is closed to supply a power while adjusting an output of the power source 506 until the crucible is heated to an incandescent state of an appropriate temperature for evaporating the crystal 508. About 100 amps. of current is required for giving an appropriate temperature range (700°–1000° C.). The crystal 508 is then evaporated off to form an upward molecular stream denoted by S in the figure. The stream S is incident on the base plate 502 with an angle thereto of $\theta$ to coat the base plate 502. The angle $\theta$ is the above-mentioned incident angle and the direction of the stream S is the "oblique or tilt vapor deposition direction". The thickness of the film is determined based on the calibration of the thickness with respect to the operation time which is effected prior to the introduction of the base plate 502 into the bell jar 501. After an appropriate thickness of the film is formed, a power supply from the source 506 is decreased, the switch 504 is opened, and the bell jar 501 and the interior thereof are cooled. Then, the pressure in the bell jar is raised to atmospheric pressure and the base plate 502 is taken out from the bell jar 501.

In still another embodiment, the orientation controlling film 105 may be formed by first forming a uniform film of the above-mentioned inorganic or organic insulating material on, i.e., in contact with or above, the base plate 101a and then subjecting the surface of the film to the oblique or tilt etching to provide the surface with an orientation controlling effect.

It is preferred that the orientation controlling film 105 is also caused to function as an insulating film. For this purpose, the orientation controlling film may preferably have a thickness in the range of 100 Å to $1\mu$, especially 500 Å to 5000 Å. The insulating film also has a function of preventing the occurrence of an electric current which is generally caused due to minor quantities of impurities contained in the liquid crystal layer 103, whereby deterioration of the liquid crystal material is prevented even on repeated operations.

In the liquid crystal device according to the present invention, it is possible to form an orientation controlling film similar to the orientation controlling film 105 also on the other base plate 101a.

In the cell structure shown in FIG. 3, the liquid crystal layer 103 may be formed into a chiral smectic phase such as SmC*, SmH*, SmI*, SmJ*, SmK*, SmG* or SmF*. The liquid crystal layer 103 showing a chiral smectic phase may be formed by phase transition of a liquid crystal material on gradual cooling at a rate of, e.g., 1°–10° C./hour from a higher temperature phase such as cholesteric phase (chiral smectic phase), nematic phase or isotropic phase to SmA (smectic A phase) and then on further gradual cooling to the chiral smectic phase, or by phase transition on gradual cooling from such as higher temperature phase as cholesteric phase, etc., to the chiral smectic phase not through SmA.

As an important feature of the present invention, the liquid crystal material as described above may be formed into a monodomain of smectic phase. More specifically, the liquid crystal material, particularly a liquid crystal composition, may be composed so as to cause a successive phase transition of isotropic phase-cholesteric phase-SmA-chiral smectic phase, isotropic phase-cholesteric phase-chiral smectic phase or isotropic phase-SmA-chiral smectic phase.

Figure 4:
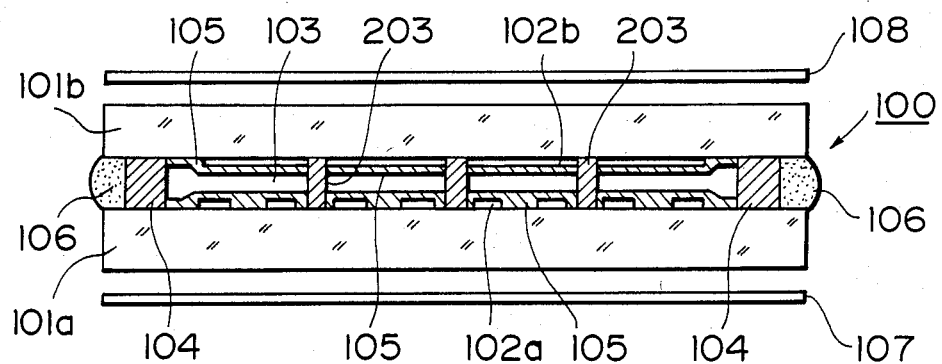
FIG. 4A is a sectional view showing another example of the liquid crystal device according to the present invention.

FIG. 4 shows another embodiment of the liquid crystal device according to the present invention. In the liquid crystal device shown in FIG. 4, a plurality of spacer members 203 are disposed between a pair of base plates 101a and 101b. The spacer members 203 can be provided, for example, by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin on the base plate 101a on which an orientation controlling film 105 has been provided, and by etching the film to leave the spacer members 203 at appropriate parts.

Such a cell structure 100 having base plates 101a and 101b as shown in FIG. 3 or FIG. 4 is sandwiched between a pair of polarizers 107 and 108 arranged in the form of cross nicols to form an optical modulation device causing optical modulation when a voltage is applied between electrodes 102a and 102b.

Next, an example of driving method using a ferroelectric liquid crystal is explained with reference to FIGS. 6–9.

Figure 7C:
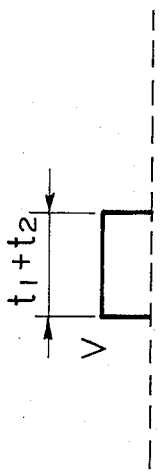
FIGS. 7A to 7D illustrate signals for driving a liquid crystal device according to the present invention.
Figure 7D:
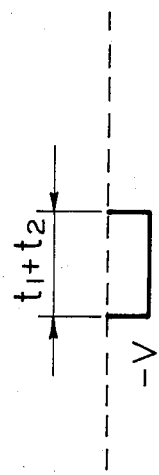
Figure 7A:
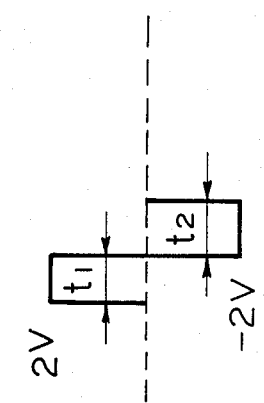
Figure 7B:
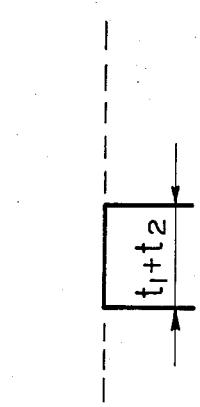

Referring to FIG. 6, there is schematically shown an example of a cell 61 having a matrix electrode arrangement in which a ferroelectric liquid crystal material (not shown) is interposed between a pair of groups of electrodes oppositely spaced from each other. Reference numerals 62 and 63 respectively denote a group of scanning electrodes to which scanning signals are applied and a group of signal electrodes to which information signals are applied. Referring to FIGS. 7A and 7B, there are respectively shown scanning electric signals applied to a selected scanning electrode $S_1$ and electric signals applied to the other scanning electrodes (non-selected scanning electrodes) $S_2$, $S_3$, $S_4$, .... On the other hand, FIGS. 7C and 7D show electric signals applied to the selected signal electrode $I_1$, $I_3$, $I_5$ and electric signals applied to the non-selected signal electrodes $I_2$, $I_4$, respectively. In FIGS. 7A to 7D and 8A to 8D, the abscissa and the ordinate represent a time and a voltage, respectively. For instance, when displaying a motion picture, the group of scanning electrodes 62 are sequentially and periodically selected. If a threshold voltage for giving a first stable state of the liquid crystal having bistability is referred to as $-V_{th1}$ and a threshold voltage for giving a second stable state thereof as $+V_{th2}$, an electric signal applied to the selected scanning electrode 62($S_1$) is an alternating voltage showing 2 V at a phase (time) $t_1$ and $-2$ V at a phase (time) $t_2$, as shown in FIG. 7A. When such an electric signal having plural phases of mutually different voltages is applied to a selected scanning electrode, an important effect can be obtained that conversion between the first and second stable states corresponding to optically "bright" and "dark" states, respectively, can be quickly caused.

Figure 8A:
FIGS. 8A to 8D illustrate waveforms applied to respective picture elements.
Figure 8B:

On the other hand, the other scanning electrodes $S_2$-$S_5$ ... are grounded as shown in FIG. 7B. Accordingly, the electric signals operating thereon show zero volt. On the other hand, an electric signal applied to the selected signal electrode $I_1$, $I_3$, $I_5$ shows V as indicated in FIG. 7C while an electric signal applied to the non-selected signal electrode $I_2$, $I_4$ shows $-V$ as indicated in FIG. 7D. In this instance, the voltage V is set to a desired value which satisfies $V<V_{th2}<3$ V and $-3$ V$<-V_{th1}<-V$. Voltage waveforms applied to picture elements A and B, for example, among the picture elements shown in FIG. 6 when such electric signals are given as shown in FIGS. 8A and 8B, respectively. Namely, as seen from FIG. 8A, a voltage of 3 V above the threshold level $V_{th2}$ is applied to the ferroelectric liquid crystal at the picture element A on the selected scanning line at a phase $t_2$. Further, a voltage of $-3$ V exceeding the threshold level $-V_{th1}$ is applied to the ferroelectric liquid crystal at the picture elements B on the same scanning line at a phase $t_1$. Accordingly, depending upon whether a signal electrode is selected or not on a selected scanning electrode line, the orientation of liquid crystal molecules changes. Thus, when a certain signal electrode is selected, the liquid crystal molecules are oriented to the first stable state, while when not selected, are oriented to the second stable state. In either case, the orientation of the liquid crystal molecules is not related to the previous states of each picture element.

Figure 8C:
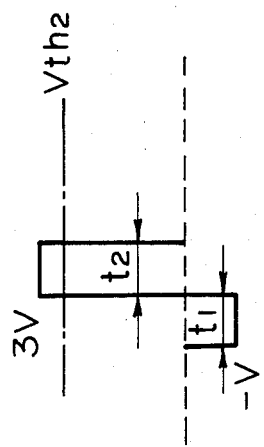
Figure 8D:
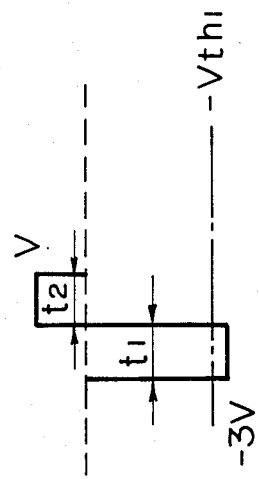

On the other hand, as shown in FIGS. 8C and 8D, the voltage applied to all the picture elements on the non-selected scanning lines is $+V$ or $-V$, each not exceeding the threshold level. Accordingly, the ferroelectric liquid crystal molecules electrically connected to the respective picture elements on the non-selected scanning lines are placed in the orientations corresponding to signal states produced when they have been last scanned without change in orientation. Namely, when a certain scanning electrode is selected, signals corresponding to one line are written and thus writing of signals corresponding to one frame is completed. The signal state of each picture element can be maintained until the line is subsequently selected. Accordingly, even if the number of scanning lines increases, the duty ratio does not substantially change, resulting in no possibility of lowering in contrast, occurrence of crosstalk, etc.

Then, a possible problem which can occur when a device as described above is actually driven as a display device, is considered. Referring to FIG. 6, it is assumed that, among the picture elements formed at intersections of the scanning electrodes $S_1$-$S_5$ ... and the signal electrodes $I_1$-$I_5$, the picture elements with hatching are in the "bright" state and picture elements drawn in white are in the "dark" state. When display states on a signal electrode $I_1$ in FIG. 6 are noted, a picture element (A) on a scanning electrode $S_1$ is in the "bright" state, and the other picture elements (B) are all in the "dark" state. As a driving mode for obtaining such a display plate, FIG. 9 shows an example of the scanning signals, an information signal applied to a signal electrode $I_1$ and a voltage applied to the picture element A in time series.

Figure 9:
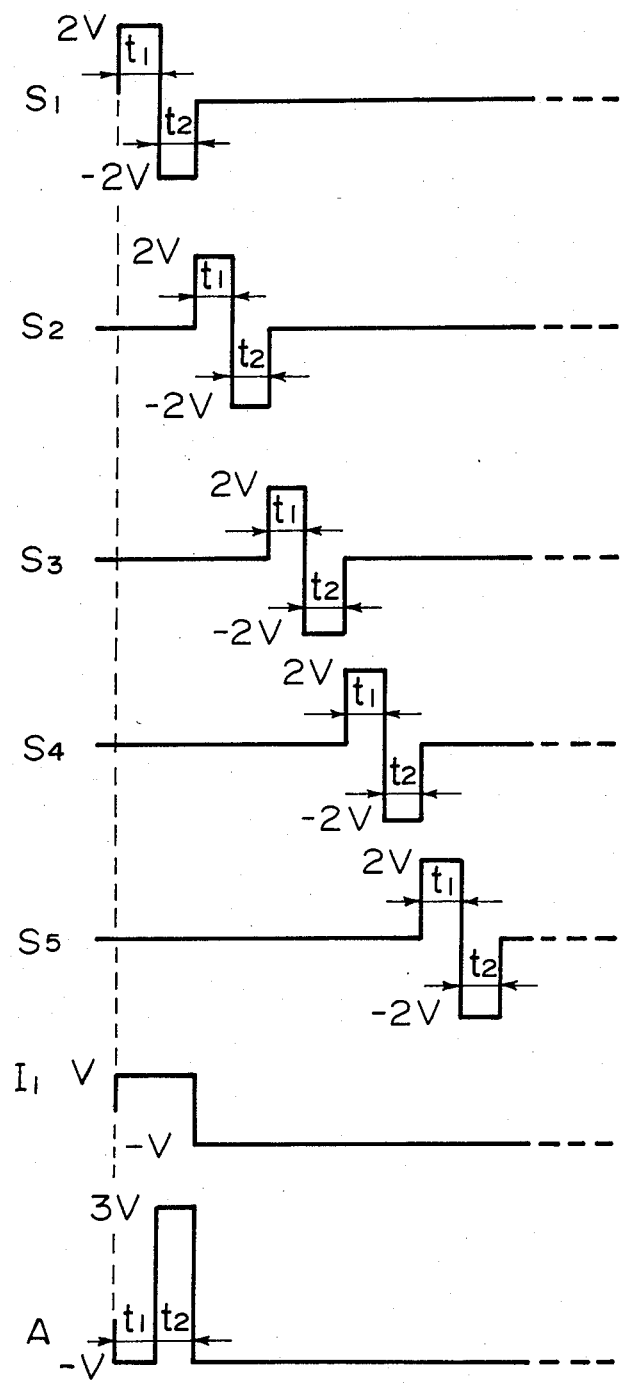
FIG. 9 illustrates waveforms applied in time series to a liquid crystal device according to the present invention.

In the driving mode shown in FIG. 9, when a scanning electrode $S_1$ is scanned, a voltage of 3 V exceeding the threshold voltage $V_{th2}$ is applied to the picture element A at time $t_2$, so that the picture element A is oriented or switched to one stable state, i.e., the bright state, regardless of its previous state. After that, during the period when scanning electrodes $S_2$-$S_5$ ... are scanned, a voltage of $-V$ is continually applied and the picture element A is expected to keep its "bright" state as the voltage $-V$ does not exceed the threshold voltage $-V_{th1}$. As a matter of actual problem, however, when one direction of signal (one for providing "dark" state in this case) is continually applied to one signal electrode, a reversal of display states can occur especially in a case where a very large number of scanning lines are used and a high speed driving is pursued. Such a reversal phenomenon can be effectively prevented by using the above mentioned specific mesomorphic or liquid crystal compound or a liquid crystal composition containing the same.

Some examples of preparation of the liquid crystal device will now be explained.

EXAMPLE 1

On a square glass base plate were formed ITO (Indium-Tin-Oxide) electrode films in the form of stripes with a width of 62.5 μm at a pitch of 100 μm. In an apparatus for the oblique vapor deposition as shown in FIG. 5, the base plate was disposed with its face having the ITO film being directed downward and a crystal of $SiO_2$ was set in a crucible of molybdenum. Then the vapor deposition apparatus was evacuated to a vacuum of the order of $10^{-5}$ mmHg and $SiO_2$ was obliquely vapor-deposited in a prescribed manner to form an electrode plate with an 800 μ-thick oblique vapor deposition film (A electrode plate).

On the other hand, on a similar glass plate provided with stripe-form ITO electrode films was applied a polyimide-forming solution ("PIQ" produced by Hitachi Kasei Kogyo K.K.; Non-volatile content: 14.5 wt.%) by means of a spinner coater, which was then heated at 120° C. for 30 minutes, at 200° C. for 60 minutes and then at 350° C. for 30 minutes to form a film of 800 Å in thickness (B electrode plate).

Then, a heat-setting epoxy adhesive was applied to the periphery of the A electrode plate except for the portion forming an injection port by screen printing process. The A electrode plate and the B electrode plate were superposed with each other so that their stripe-pattern electrodes crossed each other at right angles and secured to each other with a polyimide spacer while leaving the gap of 2µ therebetween, thereby to form a cell (blank cell).

The above mentioned 2-methylbutyloxyphenyl-5-(octyloxyphenyl)pyrazine-2-carbonate was heated into isotropic phase and injected through the injection port of the above-prepared cell, and the injection port was sealed. The liquid crystal cell thus formed was gradually cooled and was observed through a microscope while maintained at 125° C. and being sandwiched between a pair of polarizers arranged in a cross nicol relationship, whereby a monodomain of SmC* phase with non-spiral structure and free of orientation defects tion forming an injection port by screen printing process, the other electrode plate was superposed thereon in the arrangement described above, and the two electrode plates were secured to each other with a polyimide spacer while leaving the gap of 2 microns therebetween.

Into the thus prepared cell was injected a liquid composition A as described below, and the injection port was sealed. The liquid crystal cell thus formed was gradually cooled and was observed through a microscope while being sandwiched between a pair of polarizers arranged in a cross nicol relationship, whereby a monodomain of SmC* phase with non-spiral structure and free of orientation defects was found to be formed.

Liquid crystal composition A

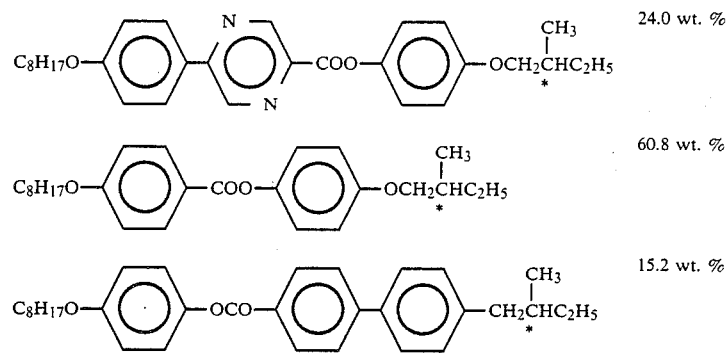

was found to be formed. Further, the electric field responce characteristic of the cell was tested at 125° C. whereby a response speed of below 1 msec. was attained at 50 volts. Further, the reversal of the display state was not caused under application of a direct current field of 40 volts for more than 10 msec., so that the cell was found to have an excellent threshold characteristic.

EXAMPLE 2

On two square glass plates each provided with stripe-form ITO electrode films as used in Example 1 was respectively applied a polyimide-forming solution (the same as the one used in Example 1) by means of a spinner coater, which was then heated at 120° C. for 30 minutes, at 200° C. for 60 minutes and at 350° C. for 30 minutes to form a film of 800 Å in thickness. The polyimide films on the thus obtained two electrode plates were respectively subjected to rubbing treatment with velvet in one direction so that, when the two electrode plates were superposed each other, their rubbing directions were parallel with each other and their stripe form ITO electrodes crossed each other at right angles.

Then, a heat-setting epoxy adhesive was applied to the periphery of one electrode plate except for the por- The electric field responsive characteristic of the cell thus formed was tested, whereby a response speed of below 1 msec. was attained at 20 volts and a good contrast was obtained.

Example 3

The following liquid crystal composition B was prepared as a mixture of a pyrazine compound according to the present invention having no optically active group but showing SmC phase and a liquid crystal compound showing only cholesteric phase. The liquid crystal composition B showed SmC* phase in a temperature range of 112°–171° C.

Liquid crystal composition B

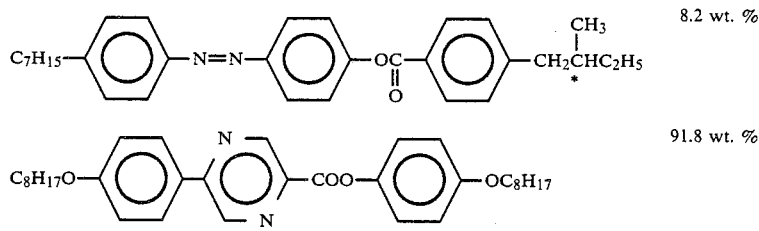

A ferroelectric liquid crystal device was prepared in the same manner as in Example 2 except that the liquid crystal composition B was used in place of the liquid crystal composition A. The thus prepared liquid crystal device was observed through a polarizing microscope whereby a monodomain of non-spiral structure free of orientation defects was confirmed to be formed.

The responsive characteristic of the device was tested at 164° C. whereby a response speed of below 10 msec. was attained at 10 volts to provide a good contrast.

EXAMPLE 4

A ferroelectric liquid crystal device was prepared in the same manner as in Example 2 except that the following liquid crystal composition C showing SmC* phase at 10°–55° C. was used in place of the liquid crystal composition A.

Liquid crystal composition C

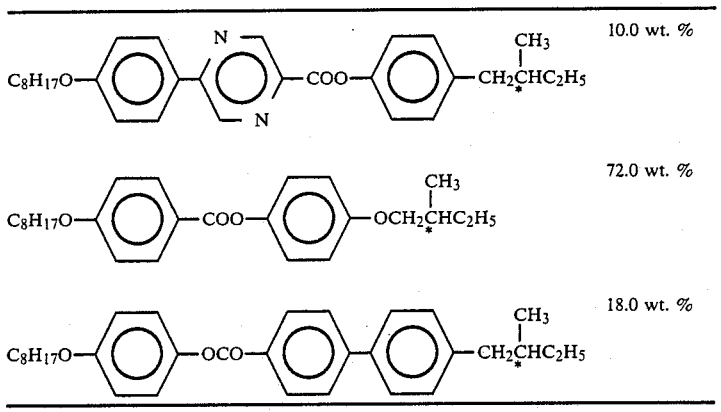

The thus obtained liquid crystal device was observed through a polarizing microscope, whereby it was confirmed that a monodomain of non-spiral structure free of orientation defects was formed.

The responsive characteristic of the device was tested, whereby a high response speed of below 1 msec. was attained at 20 volts to provide a good contrast.

EXAMPLE 5

On two electrode plates with stripe-form electrodes designed to cross each other to form opposite matrix electrodes, a 5 wt.% solution of a polyamic acid resin (reaction product of pyromellitic anhydride and 4,4'-diaminodiphenyl ether) in N-methylpyrrolidone was applied and heated to 250° C. to cause ring-closure reaction to form a 100 Å-thick polyimide film. The polyimide films on the two electrode were respectively rubbed in one direction, and the electrode plates were fixed to each other so that their rubber directions were in parallel with each other to form a cell having a gap of 1 micron.

Then, 2-methylbutyloxyphenyl-5-(octyloxyphenyl)-pyrazine-2-carbonate in isotropic phase was injected into the above cell by vacuum injection method. After sealing, the cell was gradually cooled at a rate of 0.5° C./hr to prepare a liquid crystal cell of SmC*.

A polarizer and an analyzer were disposed on both sides of the liquid crystal cell in a cross nicol relationship, and signals having waveforms as shown in FIGS. 7 and 8 were applied to the matrix electrodes at 125° C. The scanning signal was an alternating waveform of +8 volts and −8 volts as shown in FIG. 7A, the writing signals were +4 volts and −4 volts, respectively, the writing pulse duration was 500 μsec., and the one-frame period was 30 msec.

As a result of the memory-drive type line-by-line writing operation as described hereinbefore under these conditions, this liquid crystal device provided a normal motion picture display without causing reversal of written states.

EXAMPLES 6–8

Liquid crystal devices were prepared in the same manner as in Example 5 except that the liquid crystal was replaced by liquid crystal compositions D (Example 6), E (Example 7) and F (Example 8), respectively, shown below. The liquid crystal devices were respectively used for motion picture display as explained in Example 5, whereby no reversal phenomenon was observed in any of the pictures.

Composition D

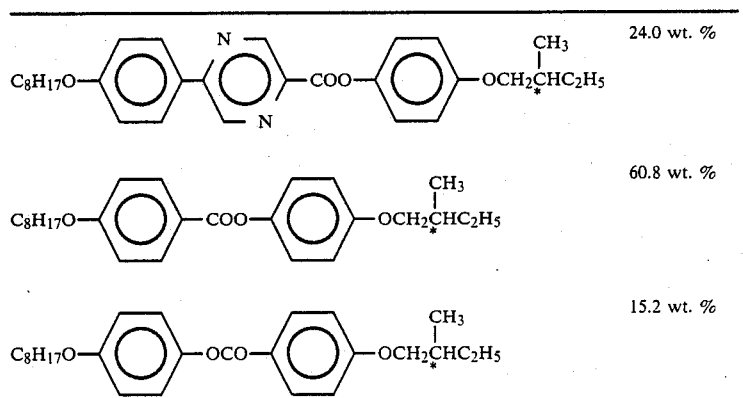

Composition E

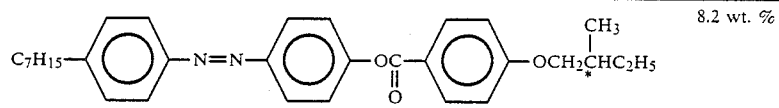 8.2 wt. %

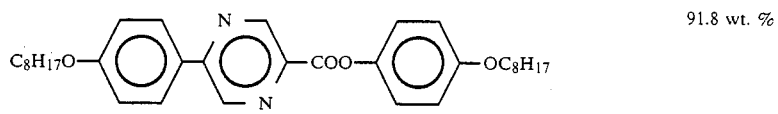 91.8 wt. %

Composition F

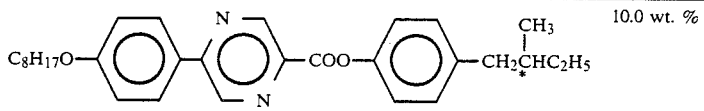 10.0 wt. %

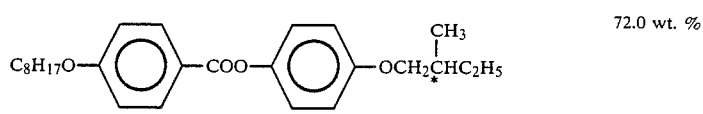 72.0 wt. %

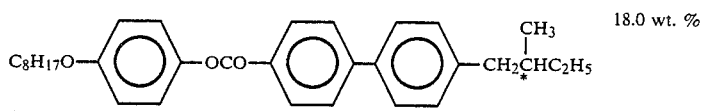 18.0 wt. %

COMPARATIVE EXAMPLES 1 and 2

Comparative liquid crystal compositions D' (Comparative Example 1) and F' (Comparative Example 2) were prepared by omitting the liquid crystal compounds represented by the formula (I) from the liquid crystal compositions D and F used in Examples 6 and 8, respectively. Liquid crystal devices were respectively prepared by using these comparative compositions and driven in the same manner as described above, whereas normal motion pictures could not be formed because reversal phenomena occurred.

Comparative composition D'

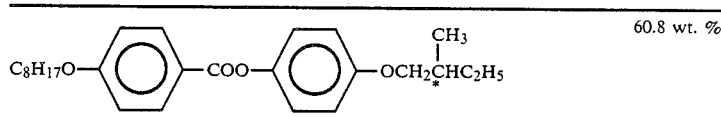 60.8 wt. %

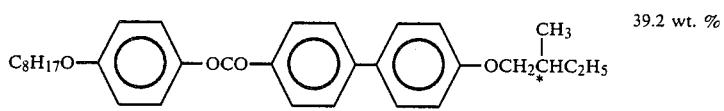 39.2 wt. %

Comparative composition F'

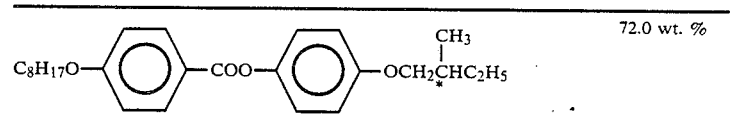 72.0 wt. %

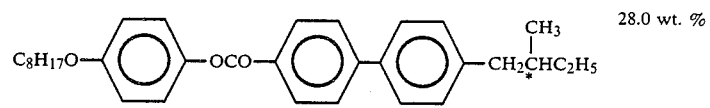 28.0 wt. %

As described hereinabove, the present invention provides a smectic phase free of orientation defects by using the above-mentioned specific class of mesomorphic compound, particularly a ferroelectric liquid crystal phase of non-spiral structure free of orientation defects.

Further, the ferroelectric liquid crystal device according to the present invention has an advantageous feature that a reversal phenomenon which has occurred when switching or display is performed by a time-sharing driving method of the memory driving type can be effectively prevented by using a mesomorphic compound having an optically active group as described above or a liquid crystal composition containing the same.

What is claimed is:

1. A liquid crystal device comprising a cell structure including a pair of base plates and a liquid crystal compound represented by the formula (I) shown below or a liquid crystal composition containing the compound and interposed between the pair of base plates; said liquid crystal compound or composition being in a smectic phase formed through a phase transition from a higher temperature phase, a face of at least one of said pair of base plates having been provided with a function of preferentially orienting the axes of the liquid crystal molecules contacting the face in one direction:

formula (I)

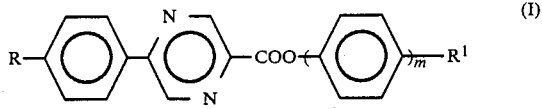

wherein R is an alkyl or alkoxy group having 1–18 carbon atoms; m is 0 or 1; $R^1$ is an alkyl group having 1 to 18 carbon atoms when m is 0 and is an alkyl or alkoxy group having 1–18 carbon atoms when m is 1.

2. A liquid crystal device according to claim 1, wherein $R^1$ is an optically active 2-methylbutyl group.

3. A liquid crystal device according to claim 1, wherein $R^1$ is an optically active 2-methylbutoxy group.

4. A liquid crystal device according to claim 1, wherein said higher temperature phase is cholesteric phase, nematic phase, or isotropic phase.

5. A liquid crystal device according to claim 1, wherein said smectic phase is a chiral smectic phase.

6. A liquid crystal device according to claim 5, wherein said chiral smectic phase is a phase wherein liquid crystal molecules oriented to at least a first stable state and a second stable state occur under no electric field.

7. A liquid crystal device according to claim 1, wherein said liquid crystal composition contains at least a liquid crystal compound represented by the formula (I) and another liquid crystal compound showing a chiral smectic phase.

8. A liquid crystal device according to claim 7, wherein said another liquid crystal compound is a liquid crystal compound also showing smectic A phase.

9. A liquid crystal device according to claim 7, wherein said another liquid crystal compound is a liquid crystal compound also showing cholestric phase.

10. A liquid crystal device according to claim 7, wherein said another liquid crystal compound is a liquid crystal compound also showing smectic A phase and cholesteric phase.

11. A liquid crystal device according to claim 1, wherein said liquid crystal composition contains at least a liquid crystal compound represented by the formula (I) and another liquid crystal compound not showing a chiral smectic phase.

12. A liquid crystal device according to claim 11, wherein said another liquid crystal compound is a liquid crystal compound also showing smectic A phase.

13. A liquid crystal device according to claim 11, wherein said another liquid crystal compound is a liquid crystal compound also showing cholesteric phase.

14. A liquid crystal device according to claim 11, wherein said another liquid crystal compound is a liquid crystal compound also showing smectic A phase and cholesteric phase.

15. A liquid crystal device according to claim 1, wherein said function of preferentially orienting the molecular axes in one direction has been imparted by a rubbing treatment of the base plate.

16. A liquid crystal device according to claim 15, wherein the base plate has a coating film of an insulating material.

17. A liquid crystal device according to claim 16, wherein said insulating material comprises at least one material selected from the group consisting of SiO, $SiO_2$, $Al_2O_3$, $TiO_2$, polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin and a photoresist resin.

18. A liquid crystal device according to claim 16, wherein said insulating material comprises polyimide.

19. A liquid crystal device according to claim 16, wherein said insulating material comprises polyvinyl alcohol.

20. A liquid crystal device according to claim 16, wherein said insulating material comprises polyamide.

21. A liquid crystal device according to claim 1, wherein said function of preferentially orienting the molecular axes in one direction has been imparted by oblique vapor deposition onto the base plate.

22. A liquid crystal device, comprising: a plurality of picture elements arranged in a plurality of rows, each picture element comprising a pair of oppositely spaced electrodes and a liquid crystal compound represented by the formula (I) shown below or a liquid crystal composition containing the compound interposed between the electrodes, the liquid crystal compound or composition showing at least two stable states and being oriented to one of said at least two stable states, said liquid crystal device being driven by a line-by-line writing scheme wherein a writing signal is applied to the picture elements row by row, and the written state of one row of picture elements to which the writing signal has been applied is retained until the subsequent writing signal is applied to the row of picture elements;

formula (I)

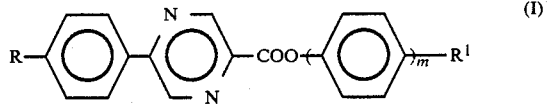

wherein R is an alkyl or alkoxy group having 1–18 carbon atoms; m is 0 or 1; $R^1$ is an alkyl group having 1 to 18 carbon atoms when m is 0 and is an alkyl or alkoxy group having 1–18 carbon atoms when m is 1.

23. A liquid crystal device according to claim 22, wherein $R^1$ is an optically active 2-methylbutyl group.

24. A liquid crystal device according to claim 22, wherein $R^1$ is an optically active 2-methylbutoxy group.

25. A liquid crystal device according to claim 22, wherein said writing signal applied to one row of picture element comprises a first signal of one polarity for orienting the liquid crystal compound or composition to the first stable state in a first phase, and a second signal of the other polarity for orienting the liquid crystal compound or composition to the second stable state in a second phase.

26. A liquid crystal device according to claim 22, wherein said writing signal applied to one row of picture elements comprises a first signal of one polarity for orienting the liquid crystal compound or composition to the first stable state, a second signal below a threshold of the liquid crystal compound or composition, a third signal of the other polarity for orienting the liquid crystal compound or composition to the second stable state and a fourth signal below the threshold; said first and second signals being applied in a first phase, said third and fourth signals being applied in a second phase.

27. A liquid crystal device according to claim 1, wherein said smectic phase is smectic A phase.

28. A liquid crystal device according to claim 1, wherein said smectic phase comprises smectic A phase and a chiral smectic phase.

* * * * *